(12) United States Patent
Amend

(10) Patent No.: US 9,057,193 B2
(45) Date of Patent: *Jun. 16, 2015

(54) SUBFLOOR COMPONENT AND METHOD OF MANUFACTURING SAME

(71) Applicant: Victor Amend, Toronto (CA)

(72) Inventor: Victor Amend, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,634

(22) Filed: Dec. 12, 2014

(65) Prior Publication Data

US 2015/0096249 A1    Apr. 9, 2015

Related U.S. Application Data

(63) Continuation-in-part of application No. 14/456,053, filed on Aug. 11, 2014, which is a continuation-in-part of application No. 14/028,703, filed on Sep. 17, 2013, which is a continuation-in-part of application No. 13/412,038, filed on Mar. 5, 2012, now Pat. No. 8,650,823.

(51) Int. Cl.
*E04C 1/00*    (2006.01)
*E04C 2/52*    (2006.01)
(Continued)

(52) U.S. Cl.
CPC .............. *E04C 2/528* (2013.01); *E04B 1/665* (2013.01); *E04C 2/16* (2013.01); *E04C 2/04* (2013.01); *E04C 2/326* (2013.01); *E04F 13/0869* (2013.01); *E04F 13/10* (2013.01); *B32B 37/04* (2013.01); *B32B 37/15* (2013.01); *B32B 37/24* (2013.01); *E04F 15/185* (2013.01); *B32B 2037/243* (2013.01); *B05D 1/02* (2013.01); *B32B 37/12* (2013.01); *B32B 38/0004* (2013.01); *B32B 38/10* (2013.01); *E04F 15/02038* (2013.01); *E04F 15/02161* (2013.01); *E04F 15/102* (2013.01); *E04F 15/107* (2013.01); *E04B 1/66* (2013.01); *B32B 2307/7265* (2013.01); *B32B 2325/00* (2013.01); *B32B 2419/04* (2013.01);
(Continued)

(58) Field of Classification Search
CPC . E04F 15/02038; E04F 15/102; E04F 15/107; E04F 15/02161; E04F 15/185; E04B 1/66; E04B 1/665; B05D 1/02; B32B 38/10; B32B 37/12; E04C 2/284
USPC ............... 52/302.1, 302.3, 302.4, 403.1, 413, 52/169.5, 169.14, 385–386, 389, 408–410, 52/789.1; 428/156, 158, 167, 172, 220, 428/318.4, 318.8
See application file for complete search history.

(56) References Cited

U.S. PATENT DOCUMENTS 4,924,645 A * 5/1990 Abeln ............................. 52/177
4,945,697 A * 8/1990 Ott et al. ...................... 52/403.1
(Continued)

FOREIGN PATENT DOCUMENTS

CA    2779036 A1    5/2013

*Primary Examiner* — Beth Stephan
(74) *Attorney, Agent, or Firm* — Renner Kenner Greive Bobak Taylor & Weber

(57) ABSTRACT

A subfloor component comprises a hardboard panel having first and second opposing faces and a plurality of intersecting grooves to define, in cross-section, a plurality of pedestals having walls that extend into the panel from the first face generally toward the second face. At least one of the pedestals has at least one wall that is undercut. The subfloor component also comprises a film of substantially moisture-impervious material attached to the first face of the panel and that conforms to the tops and walls of the pedestals and to the bottoms of the grooves.

21 Claims, 14 Drawing Sheets

(51) Int. Cl.

| | |
|---|---|
| *E04B 1/66* | (2006.01) |
| *E04C 2/16* | (2006.01) |
| *E04C 2/04* | (2006.01) |
| *E04C 2/32* | (2006.01) |
| *E04F 13/08* | (2006.01) |
| *E04F 13/10* | (2006.01) |
| *B32B 37/04* | (2006.01) |
| *B32B 37/15* | (2006.01) |
| *B32B 37/24* | (2006.01) |
| *E04F 15/18* | (2006.01) |
| *B05D 1/02* | (2006.01) |
| *B32B 38/10* | (2006.01) |
| *E04F 15/02* | (2006.01) |
| *E04F 15/10* | (2006.01) |
| *B32B 37/12* | (2006.01) |
| *B32B 38/00* | (2006.01) |

(52) U.S. Cl.
CPC ........ *B32B 2607/00* (2013.01); *Y10T 156/1064* (2013.01)

(56) References Cited

U.S. PATENT DOCUMENTS

| | | | | |
|---|---|---|---|---|
| 5,671,575 | A * | 9/1997 | Wu | 52/403.1 |
| 5,695,870 | A * | 12/1997 | Kelch et al. | 428/318.4 |
| 5,860,259 | A * | 1/1999 | Laska | 52/302.3 |
| 5,899,040 | A * | 5/1999 | Cerrato | 52/604 |
| 6,244,009 | B1 * | 6/2001 | Cerrato | 52/604 |
| 6,468,629 | B1 * | 10/2002 | Lodder | 428/158 |
| 6,607,803 | B2 * | 8/2003 | Foster | 428/77 |
| 6,918,215 | B2 * | 7/2005 | Smith | 52/177 |
| 8,769,895 | B2 * | 7/2014 | Amend | 52/309.8 |
| 2003/0154676 | A1 | 8/2003 | Schwartz | |
| 2005/0158517 | A1 * | 7/2005 | Rives et al. | 428/158 |
| 2007/0062139 | A1 * | 3/2007 | Jones et al. | 52/403.1 |
| 2008/0034690 | A1 * | 2/2008 | Gartz et al. | 52/302.3 |
| 2008/0066419 | A1 * | 3/2008 | Stanchfield et al. | 52/716.1 |
| 2008/0086958 | A1 * | 4/2008 | Schroer et al. | 52/169.14 |
| 2009/0126307 | A1 * | 5/2009 | Grohman et al. | 52/588.1 |
| 2011/0045250 | A1 * | 2/2011 | De Zen | 428/168 |
| 2011/0197543 | A1 * | 8/2011 | Lee et al. | 52/745.05 |
| 2014/0345222 | A1 * | 11/2014 | Amend | 52/309.1 |

* cited by examiner

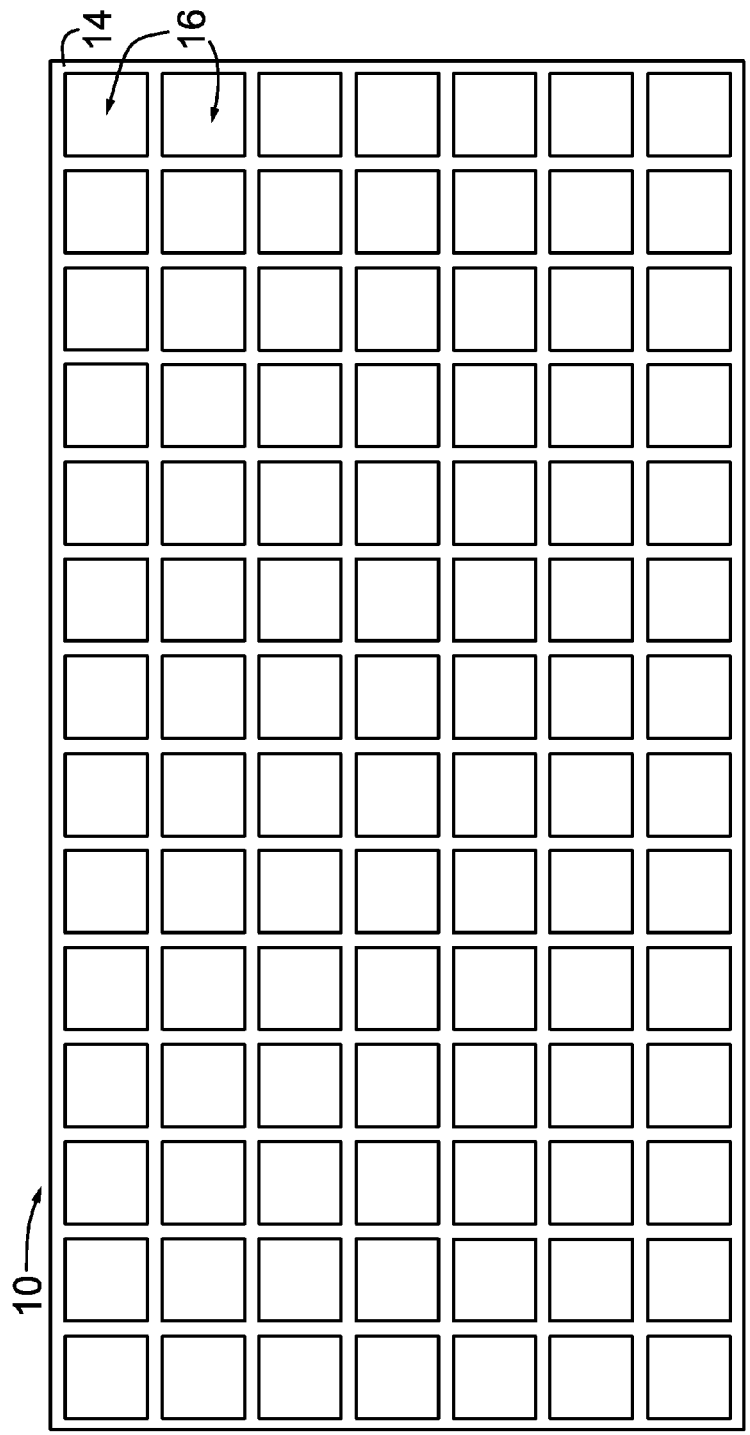
FIG. 2
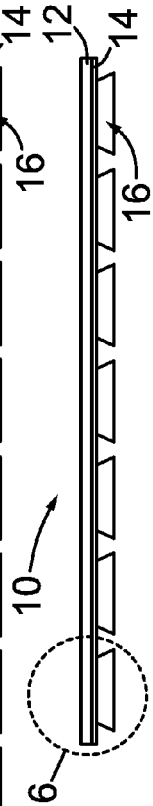
FIG. 3
FIG. 4

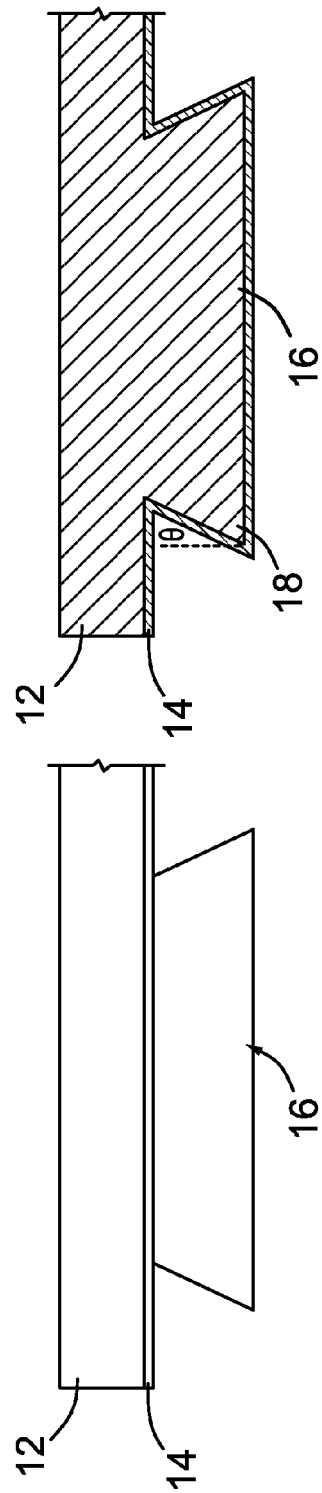
FIG. 6
FIG. 7
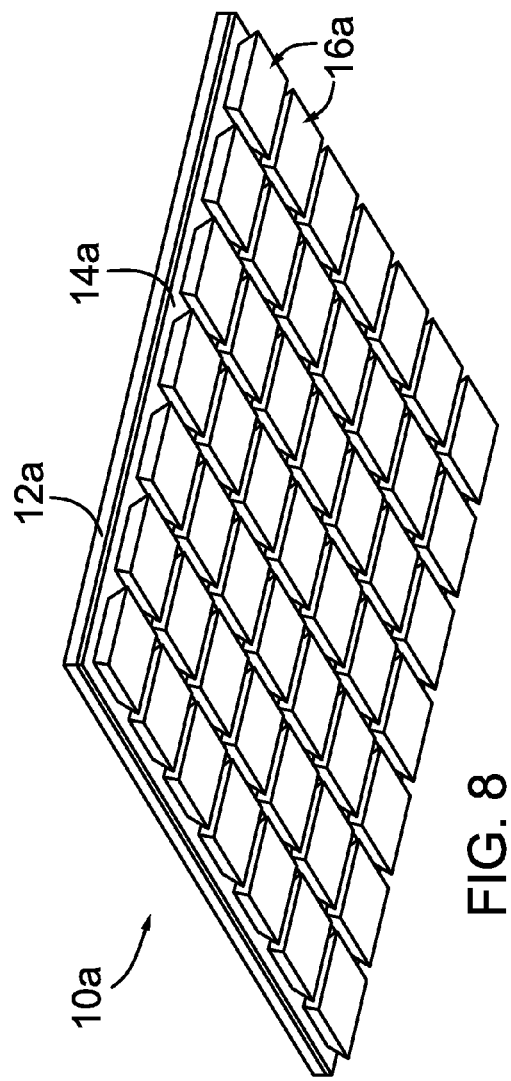
FIG. 8

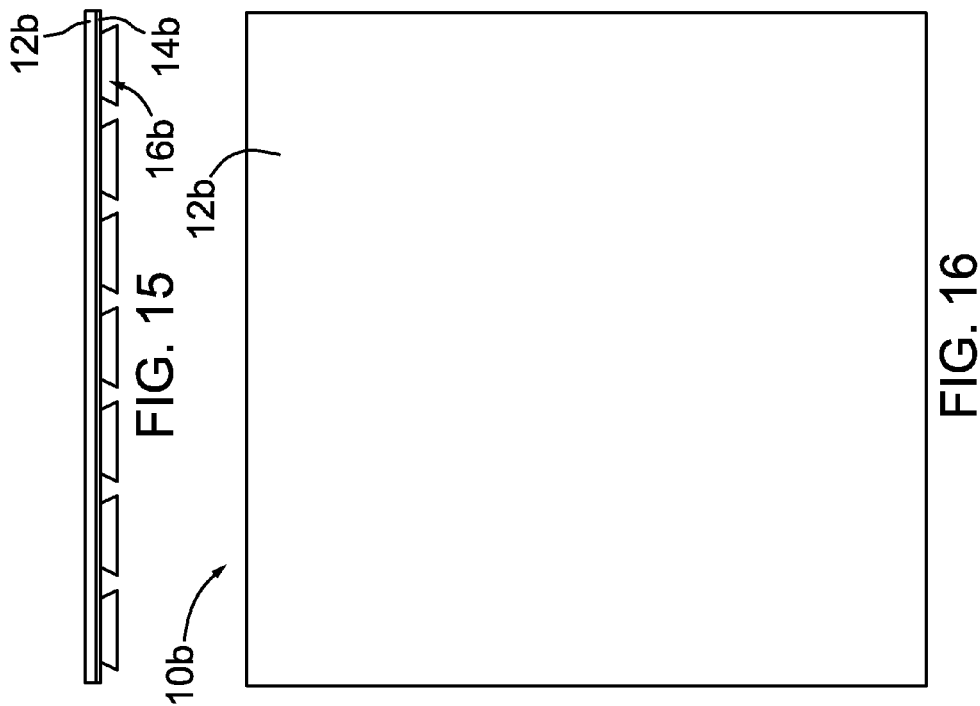
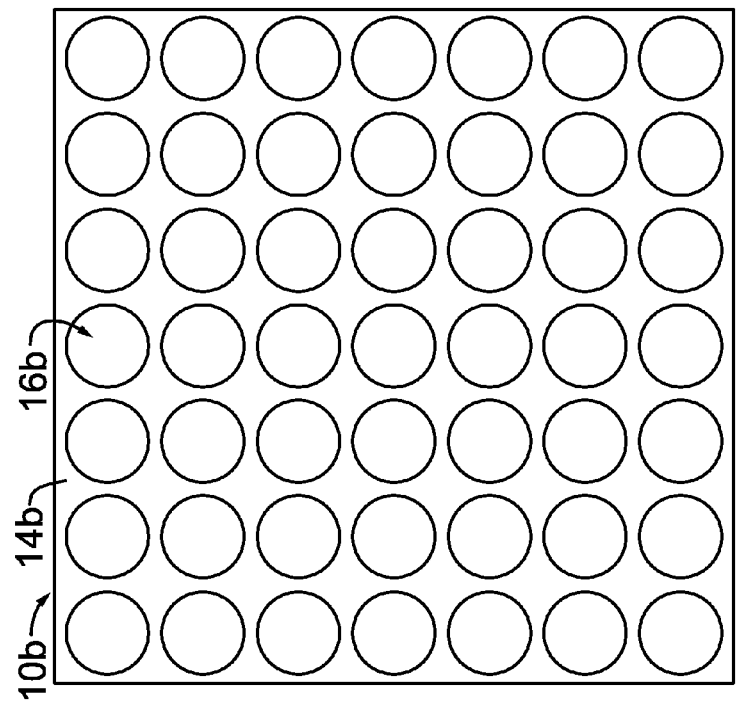
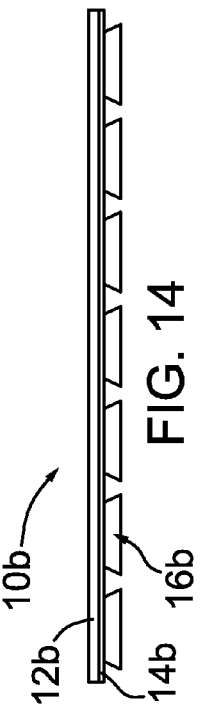

SUBFLOOR COMPONENT AND METHOD OF MANUFACTURING SAME

CROSS-REFERENCE TO RELATED APPLICATIONS

This application is a continuation-in-part of U.S. patent application Ser. No. 14/456,053 filed on Aug. 11, 2014, which is a continuation-in-part of U.S. patent application Ser. No. 14/028,703 filed on Sep. 17, 2013, which is a continuation-in-part of U.S. patent application Ser. No. 13/412,038 filed on Mar. 5, 2012, now issued as U.S. Pat. No. 8,650,823, the contents of which are incorporated herein by reference in their entireties.

FIELD OF THE INVENTION

The following is directed in general to building construction and renovation, and more particularly to a subfloor component and a method of manufacturing a subfloor component.

BACKGROUND OF THE INVENTION

A subfloor component is a panel or other component meant to be placed on top of a concrete floor or other foundation before a finished floor of, for example, hardwood or tile is installed. The subfloor component may have projections for permitting the flow of moisture underneath the component so as to prevent moisture from standing underneath the subfloor component and causing problems with mold. While subfloor components of varying types are known, improvements are desirable.

SUMMARY OF THE INVENTION

According to an aspect, there is provided a subfloor component comprising: a hardboard panel having first and second opposing faces and a plurality of intersecting grooves to define, in cross-section, a plurality of pedestals having walls that extend into the panel from the first face generally toward the second face, at least one of the pedestals having at least one wall that is undercut; and a film of substantially moisture-impervious material attached to the first face of the panel and that conforms to the tops and walls of the pedestals and to the bottoms of the grooves.

The at least one wall that is undercut may define an overhang over a respective groove. The at least one wall that is undercut may define an angle with an imaginary line that extends perpendicularly between the first face and the second face. The angle may be from about 2.5 degrees to about 50 degrees.

The film may be mechanically attached to the panel. The film may be attached to the panel by melting or partially melting the film onto the panel. The film may be spray coated onto the panel.

The film may be pre-formed to define a plurality of recesses shaped to receive the pedestals of the hardboard panel. The film may be attached to the panel by snapping the recesses onto the pedestals. Each recess may be shaped to clip onto a respective pedestal.

The film may comprise material selected from the group comprising plastic or polymer. The plastic or polymer may be selected from the group consisting of: polystyrene, polyethylene, polyester, polypropylene, polyvinyl chloride (PVC), polyethylene terephthalate (PET), or acrylonitrile butadiene styrene (ABS).

Each of the plurality of pedestals may have a single wall. The pedestals may be shaped as circles or ellipses. The intersecting grooves may be rectangular. The pedestals may be shaped as at least one of circles, ellipses, rectangles, diamonds, squares, and hexagons. The pedestals may be generally uniformly distributed across the first surface of the panel.

The hardboard panel may comprise material selected from the group consisting of: OSB (oriented strand board), plywood, fiber cement board, cement board, and magnesium oxide board.

The subfloor component may be shaped to connect to another subfloor component. The hardboard panel may comprise a tongue/groove configuration for connecting to another hardboard panel of another subfloor component. The hardboard panel may include a groove that is open along a side-facing surface of the hardboard panel, further comprising: a connector dimensioned to insert into the groove. The connector may comprise: a central body; and tongues extending outwards from the central body, wherein each tongue is dimensioned to be inserted into a respective groove in a hardboard panel of a subfloor component.

In another aspect, there is provided a method of manufacturing a subfloor component, comprising: shaping a hardboard sheet to form a hardboard panel having, in cross-section, a plurality of pedestals with walls that extend into the panel from a first face of the panel generally toward a second opposing face of the panel, at least one of the pedestals having at least one wall that is undercut; and attaching a substantially moisture-impervious film to the first face of the panel, the film conforming to the tops and walls of the pedestals and to the bottoms of the grooves.

Attaching the film may comprise partially melting or melting the film onto the first face of the panel. Attaching the film may comprise spray coating the film onto the first face of the panel.

The method may further comprise providing a pre-formed film having a plurality of recesses that are shaped to receive the pedestals of the hardboard panel. Attaching the film may comprise snapping the recesses onto the pedestals. Each recess may be shaped to clip onto a respective pedestal.

BRIEF DESCRIPTION OF THE DRAWINGS

Embodiments will now be described more fully with reference to the accompanying drawings in which:

FIG. 2 is a bottom view of the subfloor component of FIG. 1;

FIG. 3 is a side view of the subfloor component of FIG. 1;

FIG. 4 is an end view of the subfloor component of FIG. 1;

FIG. 6 is an enlarged fragmentary view of a portion of the subfloor component of FIG. 4 identified by reference numeral 6;

FIG. 7 is a sectional view of the portion of the subfloor component of FIG. 6;

FIG. 8 is a perspective view of the underside of another embodiment of a subfloor component;

FIG. 13 is a bottom view of another embodiment of a subfloor component;

FIG. 14 is a side view of the subfloor component of FIG. 13;

FIG. 15 is an end view of the subfloor component of FIG. 13;

FIG. 16 is a top view of the subfloor component of FIG. 13;

DETAILED DESCRIPTION OF THE EMBODIMENTS

Figure 1:
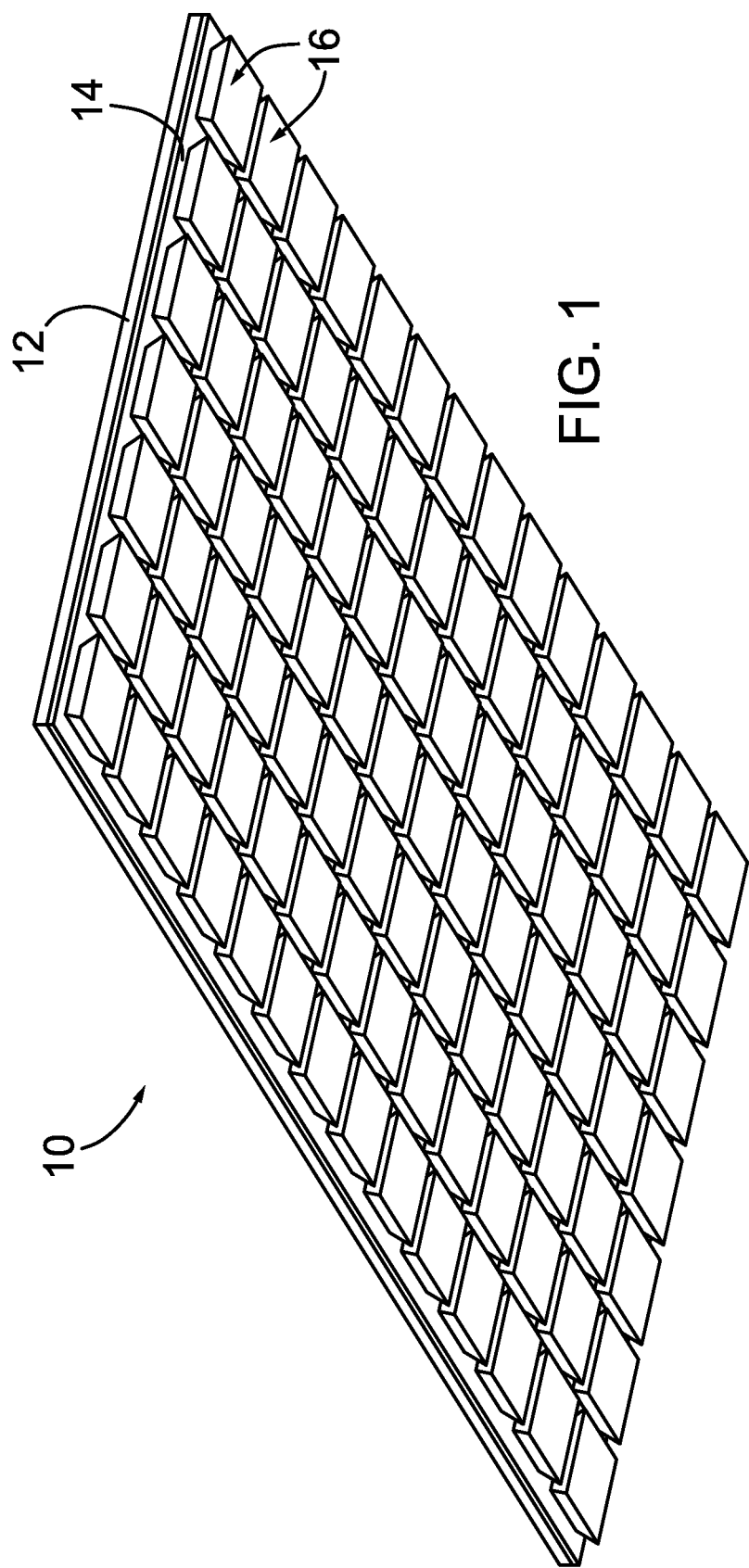
FIG. 1 is a perspective view of the underside of one embodiment of a subfloor component.
Figure 5:
FIG. 5 is a top view of the subfloor component of FIG. 1.
Figure 9:
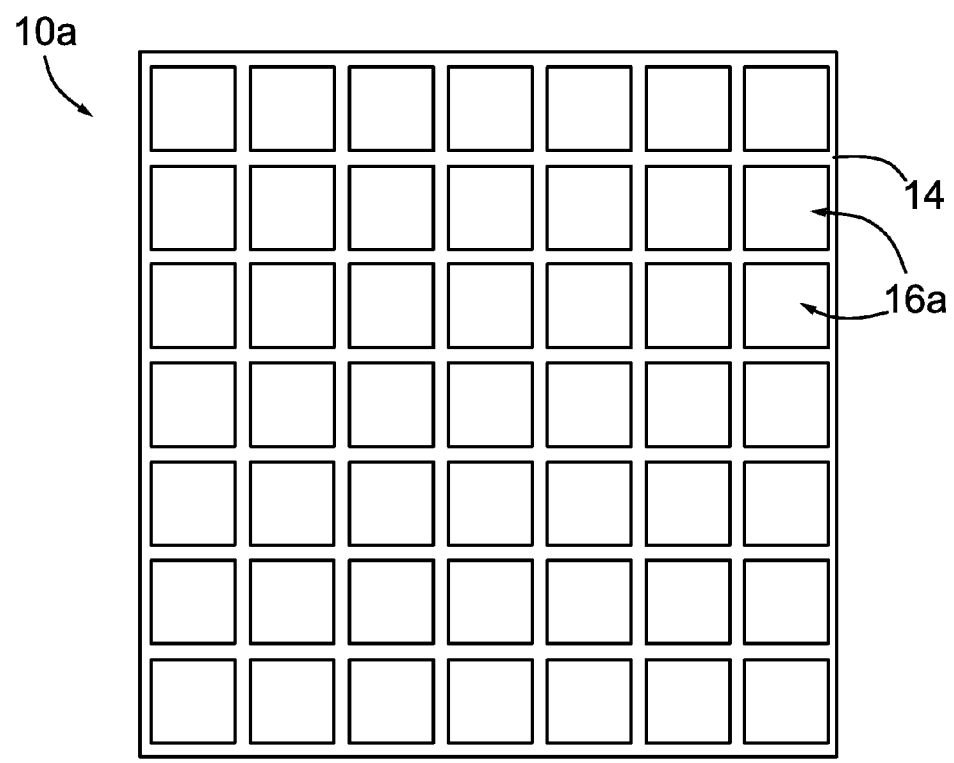
FIG. 9 is a bottom view of the subfloor component of FIG. 8.
Figure 10:
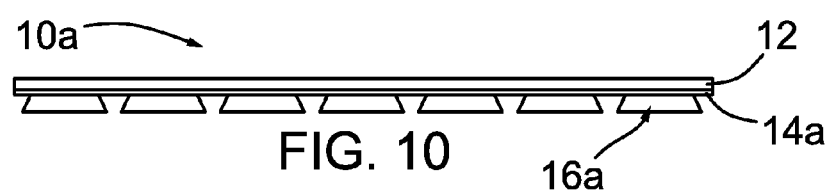
FIG. 10 is a side view of the subfloor component of FIG. 8.
Figure 11:
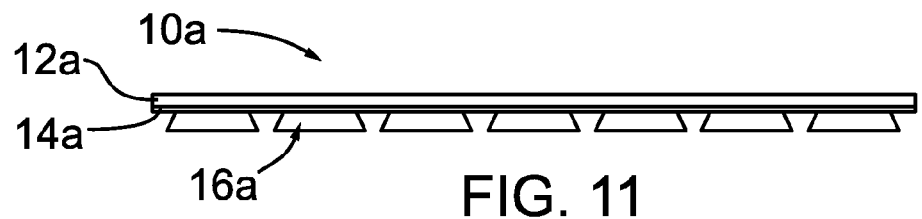
FIG. 11 is an end view of the subfloor component of FIG. 8.
Figure 12:
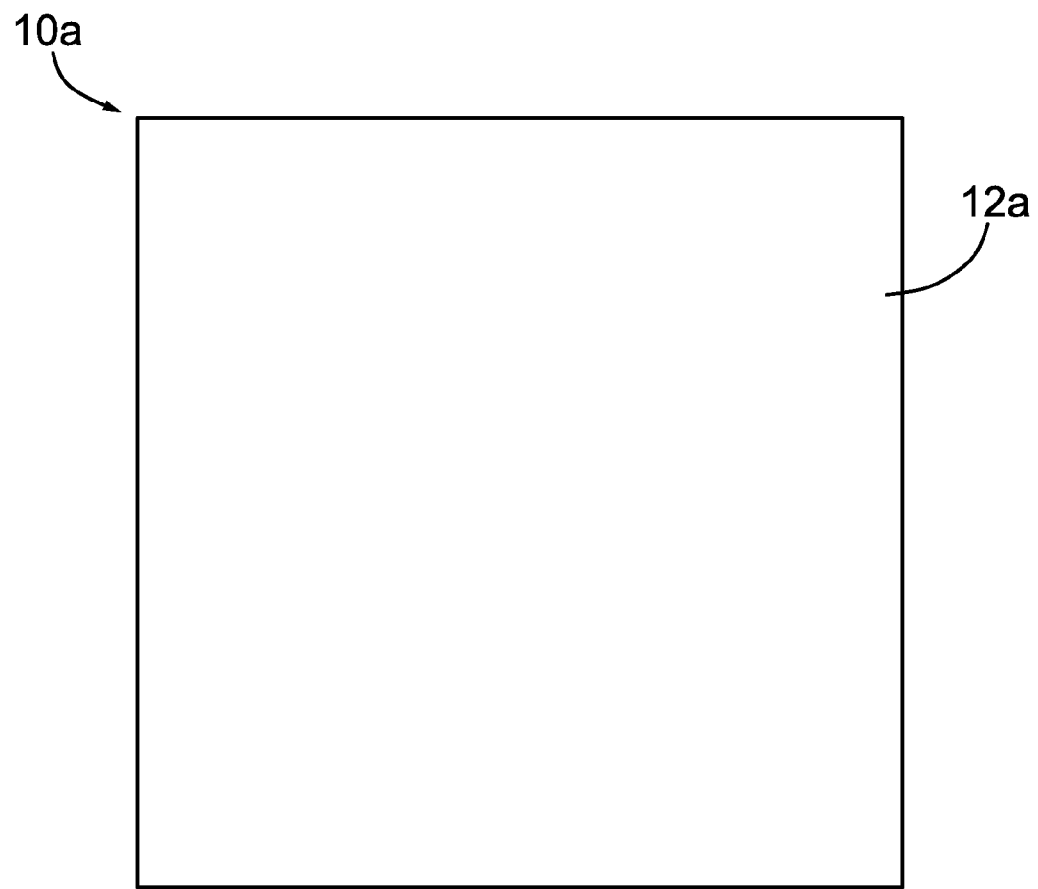
FIG. 12 is a top view of the subfloor component of FIG. 8.

In FIGS. 1 through 7, there is shown a subfloor component 10 according to an embodiment. Subfloor component 10 is rectangular in shape, and includes a hardboard panel 12 and a moisture-resistant film 14. The hardboard panel 12 includes first and second opposing faces. Multiple intersecting grooves in the first face define, in cross-section, multiple pedestals 16 that have walls that extend into the hardboard panel 12 from the first face generally toward the second face. The moisture-resistant film 14 is attached to the first face of the panel and conforms to the pedestals 16. The second face of the hardboard panel 12 is opposite from the first face, and is generally planar.

In this embodiment, the walls of each pedestal 16 are undercut, such that each undercut wall defines an overhang 18 that projects laterally over a respective groove. As shown in FIG. 7, each undercut wall has an imaginary line extending the length of the wall surface that defines an angle θ with an imaginary line extending perpendicularly between the first face and the second face. In the embodiment shown, the angle θ is about 25 degrees. As will be understood, each overhang 18 effectively provides an extension around which the film 14 conforms, which enables the film 14 to be mechanically attached to the hardboard panel 12.

In this embodiment, the hardboard panel 12 is oriented strand board (OSB), a material well-known to be employed in building construction. Also in this embodiment, the moisture-resistant film 14 is a thin layer of high-impact polystyrene, and is attached by melting or partially melting the film onto the first face of the hardboard panel 12 using a suitable heat source, while applying vacuum to the film from the second face of the hardboard panel 12 using a vacuum source. The heat source may be, for example, a radiant heater, an infrared lamp, a hot air blower, a torch, and the like. Other suitable heat sources are known to those skilled in the art. In this manner, the moisture-resistant film 14 is attached to the hardboard panel 12 such that the moisture-resistant film 14 is affixed to the tops and walls of the pedestals 16 as well as to the bottoms of the grooves.

The subfloor component 10 is to be placed on a foundation floor or other such structure with the pedestals 16 downwards and with the moisture-resistant film 14 between the hardboard panel 12 and the foundation floor. Moisture on the foundation floor is able to pass between the pedestals 16 and can contact the moisture-resistant film 14 in order to drain away from underneath the subfloor component 10. The moisture-resistant film 14 effectively resists the passage of moisture into the hardboard panel 12 from the foundation floor thereby keeping the hardboard panel 12 suitably dry. Thus, it will be understood that the moisture-resistant film 14 is substantially moisture-impervious, meaning that the moisture-resistant film 14 permits only an insignificant amount of moisture, if any, to pass therethrough.

The attachment of the moisture-resistant film 14 to the hardboard panel 12 enables the pedestals 16 to which the moisture-resistant film is conforming to have increased resistance to breakage. As will be understood, the corners and edges of the OSB can otherwise be prone to chipping or damage. In this embodiment, the pedestals 16, which are shaped as squares, each have four (4) walls meeting at four (4) edges and four (4) top corners. Particularly the top corners and also the edges are most prone to being broken away during transportation, installation, or usage. The present inventor has found that, particularly for a subfloor component 10 that will be experiencing various physical pressures from above, advantages are gained by employing a moisture-resistant film 14 that not only resists moisture reaching the hardboard panel 12 but conforms to the pedestals in order to provide drainage and also increase the structural integrity of the pedestals 16. In this way, physical pressures both during construction (workers, wheel barrows, other machinery) and when construction is complete (home owners, employees, couches, filing cabinets etc.) can be better withstood by the pedestals 16.

In this embodiment, the intersecting grooves have a depth of about 7.5 millimeters, giving the pedestals 16 a corresponding height. However, other depths are possible. For example, other embodiments may provide depths of between about 5 millimeters to about 15 millimeters. Furthermore, in this embodiment, the intersecting grooves have a width of about 15 millimeters, giving the pedestals 16 a corresponding spacing. However, other widths are possible. For example, other embodiments may provide widths of between about 15 millimeters to about 20 millimeters. It will be understood that "width" refers to the shortest width between adjacent pedestals, namely the distance between the tops of adjacent pedestals. It will also be understood that having all grooves have the same width is not required.

While the above-described subfloor component 10 can be useful for many purposes, the present inventor has also developed additional embodiments. For example, FIGS. 8 through 12 show a subfloor component 10a according to another embodiment. Subfloor component 10a is square in shape, and includes a hardboard panel 12a and a moisture-resistant film 14a. Like the embodiment described in FIGS. 1 through 7, the hardboard panel 12a includes first and second opposing faces. Multiple intersecting grooves in the first face define, in cross-section, multiple pedestals 16a that have walls that extend into the hardboard panel 12a from the first face generally toward the second face. Each wall of each pedestal 16a is undercut, such that each undercut wall defines an overhang that projects laterally over a respective groove. The moisture-resistant film 14a is attached to the first face of the panel and conforms to the pedestals 16*a*. As will be understood, each overhang effectively provides a projection around which the film 14*a* conforms, which enables the film 14*a* to be mechanically attached to the hardboard panel 12*a*. The second face of the hardboard panel 12*a* is opposite from the first face and is generally planar. As can be seen, subfloor component 10*a* is similar to subfloor component 10, but is square instead of rectangular.

FIGS. 13 through 16 show a subfloor component 10*b* according to another embodiment. Subfloor component 10*b* is square in shape, and includes a hardboard panel 12*b* and a moisture-resistant film 14*b*. Like the embodiment described in FIGS. 1 through 7, the hardboard panel 12*b* includes first and second opposing faces. Multiple intersecting grooves in the first face define, in cross-section, multiple pedestals 16*b* that each have a wall that extends into the hardboard panel 12*b* from the first face generally toward the second face. The wall of each pedestal 16*b* is undercut, such that the undercut wall defines an overhang that projects laterally over the surrounding grooves. The moisture-resistant film 14*b* is attached to the first face of the panel and conforms to the pedestals 16*b*. As will be understood, each overhang effectively provides a projection around which the film 14*b* conforms, which enables the film 14*b* to be mechanically attached to the hardboard panel 12*b*. The second face of the hardboard panel 12*b* is opposite from the first face and is generally planar. As can be seen, subfloor component 10*b* is similar to subfloor component 10, but is square instead of rectangular. Furthermore, each of the pedestals 16*b* is circular, rather than square. The pedestals 16*b* being circular means that each pedestal 16*b* only has one wall, and thus there are no top corners. Because pedestal 16*b* does not have any top corners, breakage due to handling or use of the subfloor component 10*b* is even less likely.

Still other pedestal shapes are possible. For example, the pedestals may alternatively be oval-shaped, diamond-shaped, hexagonal, rectangular, and/or may be of different sizes (e.g. a thin rectangle and a thick rectangle). Subfloor components comprising pedestals having such shapes have been disclosed in the above-incorporated U.S. Pat. No. 8,650,823. It will be understood that a subfloor component having pedestals of different shapes, including others not described or mentioned above, or mixtures of differently-shaped pedestals such as those described or mentioned above, may be provided.

The various subfloor components described herein may generally be used alongside each other in a particular installation, provided that the overall thicknesses of two different panels are similar, and provided that using differently-shaped pedestals in two different subfloor components does not unduly impede the flow of moisture beneath the subfloor components. In one embodiment, the hardboard panel of adjacent subfloor components have tongue and groove configurations along the edges which abut against each other, such that the tongue of one panel can be received within the groove of the adjacent panel. The tongues/grooves may have square, rectangular configurations with or without rounded distal corners.

Figure 17:
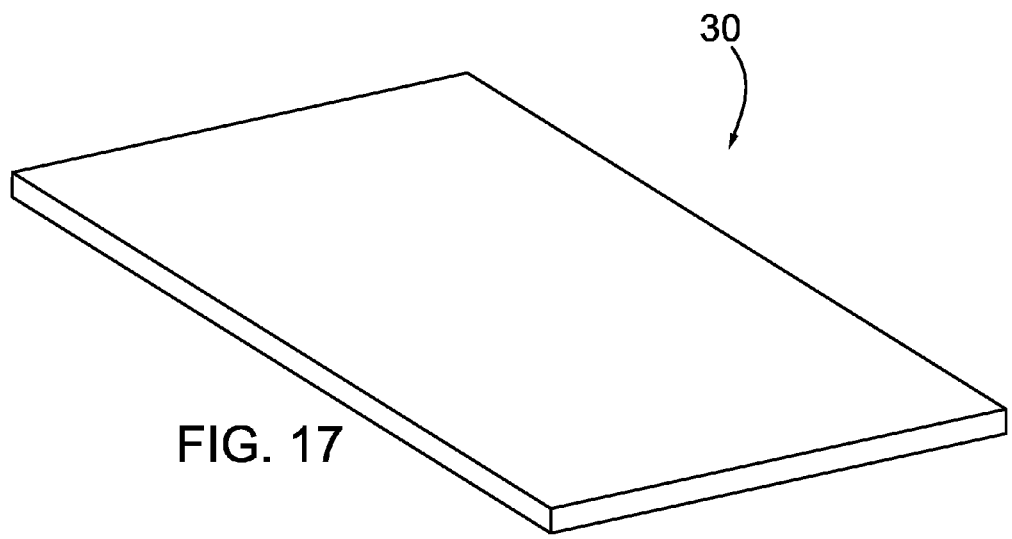
FIG. 17 is a perspective view of a hardboard sheet used to form a hardboard panel during manufacture of the subfloor component of FIG. 1.
Figure 18:
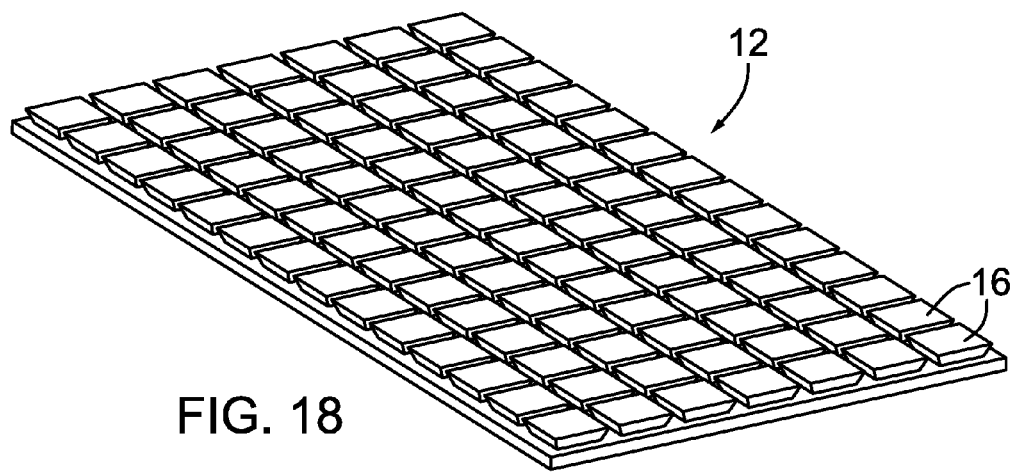
FIG. 18 is a perspective view of the hardboard panel.
Figure 19:
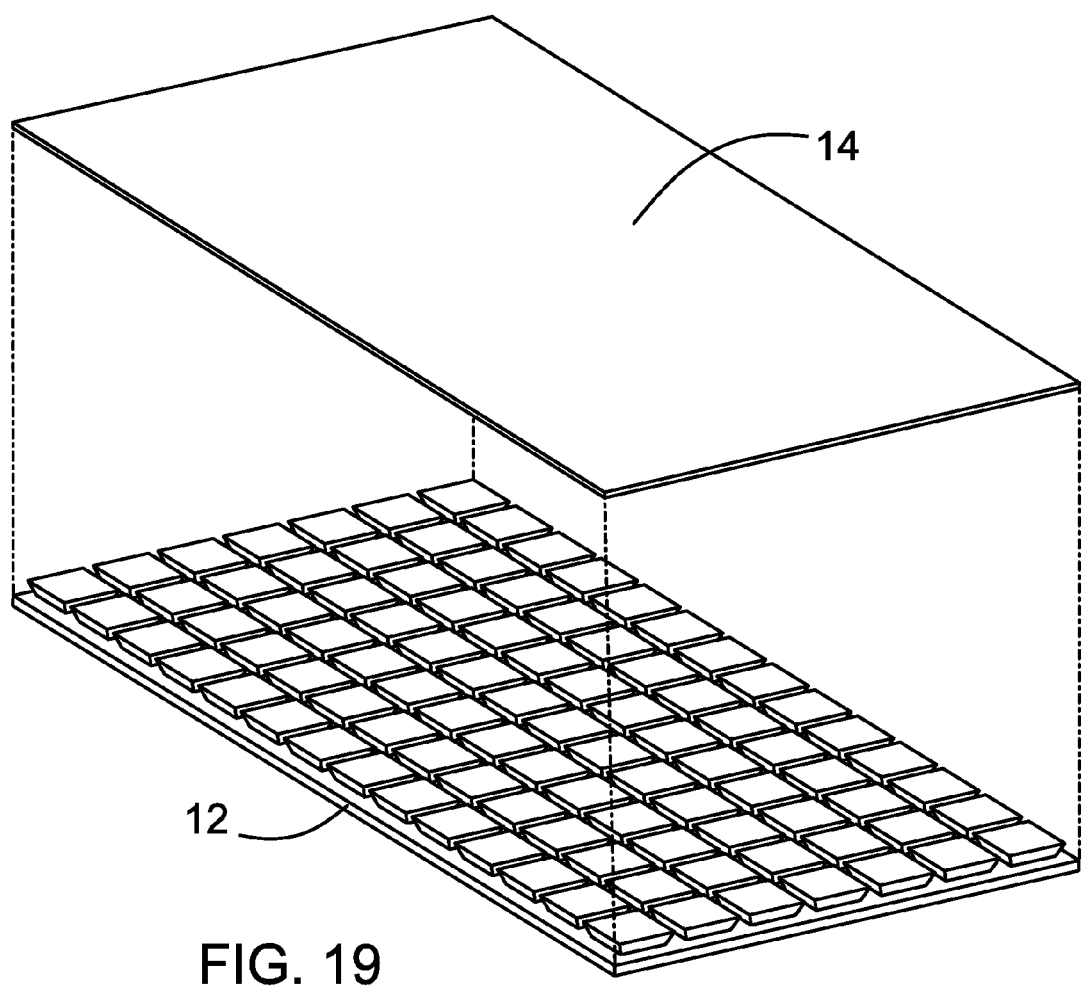
FIG. 19 is a perspective view of a moisture-resistant film being brought into contact with the hardboard panel of FIG. 18.
Figure 20:
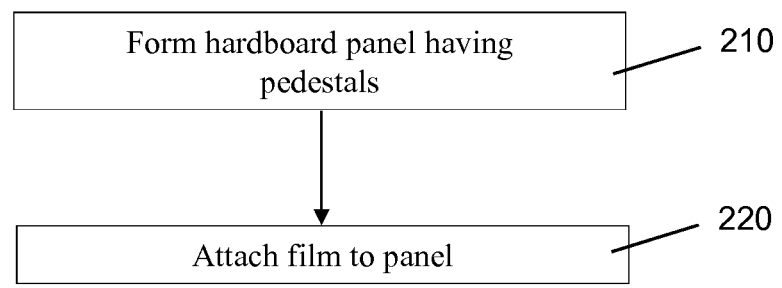
FIG. 20 is a flowchart of steps for manufacturing the subfloor component.

FIG. 20 shows a flowchart of steps of a method of manufacturing a subfloor component such as subfloor component 10 described above. The treatment of the materials involved in the steps is illustrated in FIGS. 17 through 19. In FIG. 17, a hardboard sheet 30 of OSB having generally flat, opposing faces is provided. The hardboard sheet 30 is then shaped using a suitable tool (not shown) to create the multiple intersecting grooves on one face, so as to define the pedestals 16 having undercut walls that define overhangs 18, and to thereby form the hardboard panel 12 (step 210), shown in FIG. 18. The tool may be, for example, a milling machine, a router, a table saw, and the like.

A generally flat piece of moisture-resistant film 14 is then attached to the first face of the hardboard panel 12 (step 220). During this step, a generally-flat piece of moisture-resistant film 14 is brought into contact with the first face of the hardboard panel 12 (FIG. 19). Vacuum is then applied (not shown) to the film from the second face of the hardboard panel 12 using a vacuum source (not shown) in such a manner that the moisture-resistant film 14 enters into and conforms to the pedestals 16 of the hardboard panel 12, and heat is applied (not shown) using a suitable heat source (not shown) so as to cause the film to melt or to partially melt onto the first face of the hardboard panel 12. The heat source may be, for example, a radiant heater, an infrared lamp, a hot air blower, a torch, and the like. The heat may be applied to the film 14, to the panel 12, or to both. The moisture-resistant film being of high-impact polystyrene fuses at its surface under the applied heat to the facing surface of the hardboard panel 12, and thereby forms the subfloor component 10.

In other embodiments, the moisture resistant film may alternatively be attached to the first face of the hardboard panel 12 by spray coating. For example, in one embodiment, a layer of polystyrene is deposited onto the first face of the hardboard panel 12 using a suitable spraying tool. The spraying tool may be, for example, a compressed air spray gun.

Figure 24:
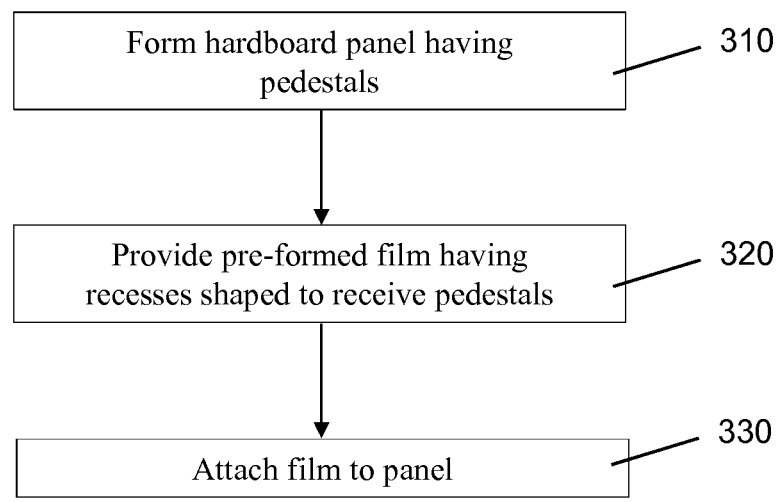
FIG. 24 is a flowchart of steps for manufacturing the subfloor component according to another embodiment.

In still other embodiments, the film may be pre-formed so as to have recesses that are shaped to receive the pedestals 16 of the hardboard panel. For example, FIG. 24 shows a flowchart of steps of another method of manufacturing a subfloor component such as subfloor component 10 described above. A hardboard sheet 30 of OSB having generally flat, opposing faces is provided. The hardboard sheet 30 is then shaped using a suitable tool (not shown) to create the multiple intersecting grooves on one face, so as to define the pedestals 16 having undercut walls that define overhangs 18, and to thereby form the hardboard panel 12 (step 310), shown in FIG. 18. The tool may be, for example, a milling machine, a router, a table saw, and the like.

A pre-formed moisture-resistant film 314 is provided (step 320). The pre-formed moisture-resistant film 314 is shaped to define a plurality of recesses 362 that are shaped to receive the pedestals 16 of the hardboard panel. The pre-formed moisture-resistant film 314 may be fabricated by one of several methods, such as by shaping a generally flat piece of moisture-resistant film (e.g. a film 14) against a mold form or within a molding apparatus, or by injection molding. Still other methods may be used to fabricate the film 314. The pre-formed moisture-resistant film 314 is resilient, and is able to return to its shape having recesses 362 after being subjected to bending, torsion, tension, compression, and the like. As will be understood, pre-formed moisture-resistant film 314 has generally the same shape as the film 14, once the film 14 has been attached to the panel 12.

Figure 21:
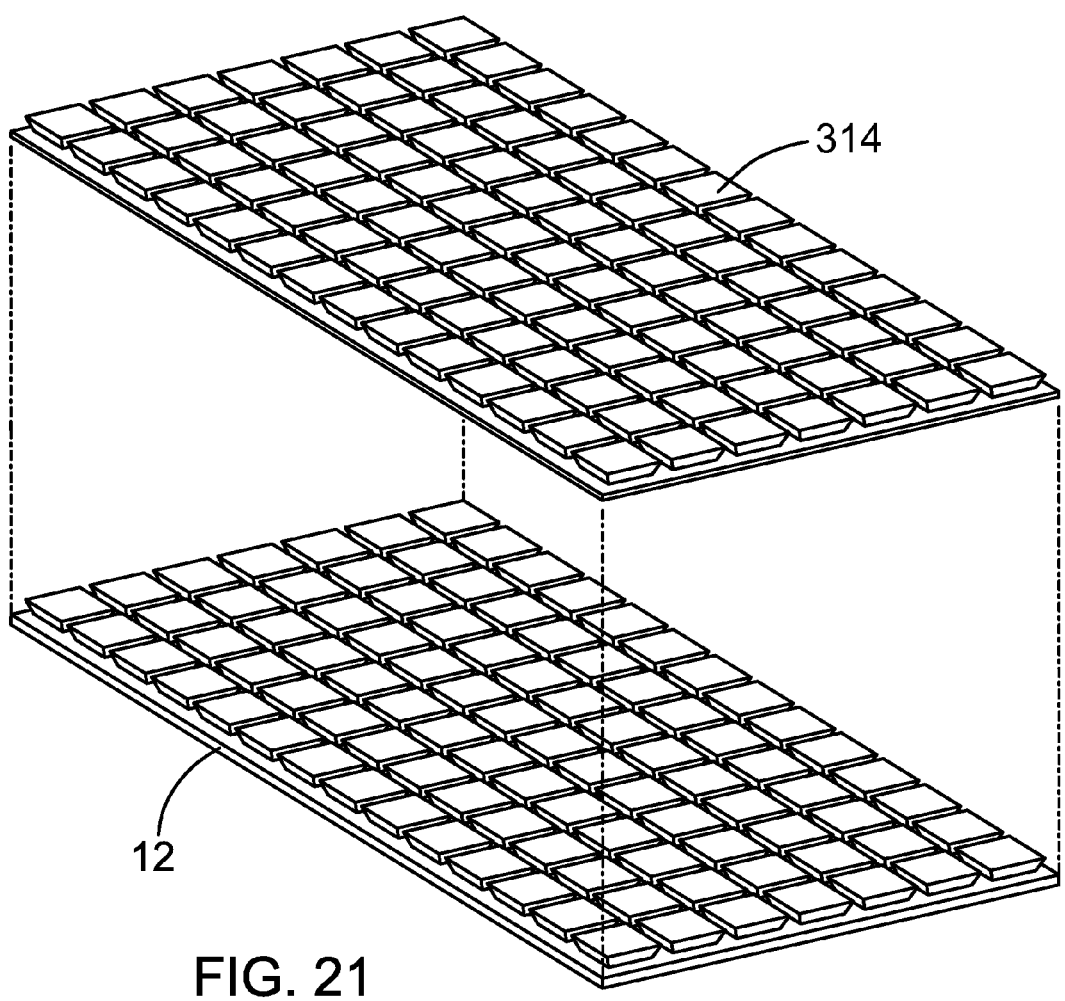
FIG. 21 is a perspective view of another embodiment of a moisture-resistant film being brought into contact with the hardboard panel of FIG. 18.
Figure 22:
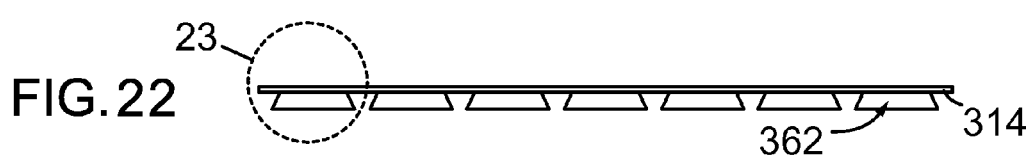
FIG. 22 is an end view of the moisture-resistant film of FIG. 21.
Figure 23:
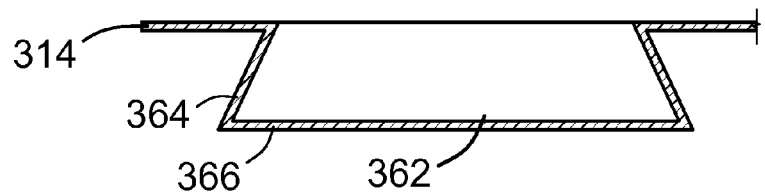
FIG. 23 is an enlarged fragmentary view of a portion of the moisture-resistant film of FIG. 22 identified by reference numeral 23.

The film 314 is then attached to the first face of the hardboard panel 12 (step 330). During this step, the film 314 is brought into contact with the first face of the hardboard panel 12 (FIG. 21), and is then attached to the panel 12 by snapping the recesses 362 onto the pedestals 16 of the hardboard panel 12. As shown in FIGS. 22 and 23, each recess 362 comprises at least one pair of adjacent surfaces 364 and 366 (FIGS. 22 and 23), which respectively correspond with an undercut wall and the top of a respective pedestal 16. Each pair of adjacent surfaces 364 and 366 cooperates resiliently so as to effectively provide a clip for mechanically attaching the film 314 to the hardboard panel 12. Upon attachment, the moisture-resistant film 314 enters into and conforms to the pedestals 16 of the hardboard panel 12, and thereby forms the subfloor component 10.

It will be understood that the steps of forming the hardboard panel 12 (step 310) and providing the pre-formed moisture-resistant film 314 (step 320) may be carried out in any order.

As discussed above, subfloor components 10 may be laid adjacent to each other on a concrete floor or other foundation. This may be done without connecting the subfloor components 10 to each other. However, as discussed, advantages lie in connecting adjacent subfloor components 10 in some manner so as to resist movement of the adjacent subfloor components 10 relative to one another.

Although in the embodiment described above, the subfloor components have tongue and groove configurations along the edges which abut against each other, in other embodiments, other configurations may be used. For example, in other embodiments, the subfloor components may alternatively have grooves along the edges, and with each groove being configured to receive a connector for connecting adjacent subfloor components. The connector may be, for example, a longitudinal connector strip comprising a central body and opposing tongues, with each tongue being shaped to be received by a respective groove.

Figure 25:
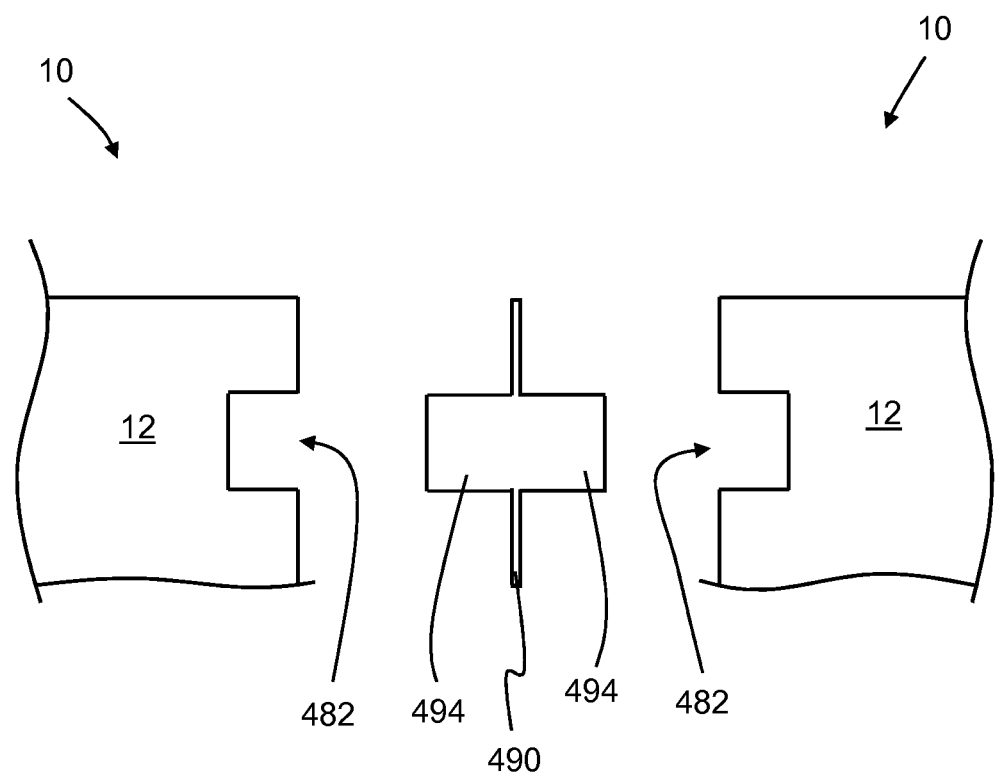
FIG. 25 is an exploded side view of a portion two subfloor components according to another embodiment, and a connector strip therebetween.

For example, FIG. 25 shows two adjacent subfloor components 10, each subfloor component 10 including a hardboard panel 12 and a moisture-resistant film 14 (not shown). The hardboard panel 12 includes first and second opposing faces, with multiple intersecting grooves in the first face defining, in cross-section, multiple pedestals (not shown), as in subfloor component 10 described above and with reference to FIGS. 1 to 7. Each hardboard panel 12 has two (2) grooves 482 formed therein on opposing sides. In this embodiment, the adjacent subfloor components 10 are configured to be connected by a connector in the form of a longitudinal connector strip 490 having a length extending into the page. The connector strip 490 comprises a thin central body and two (2) opposing tongues 494 extending therefrom, with each tongue 494 being shaped to be received by a respective groove 482 and having a thickness that provides frictional engagement with the inside of the groove 482 for connecting the adjacent subfloor components 10.

Each of the ends of hardboard panels 12 may be recessed slightly, so as to accommodate the thin central body of the connector strip 490 in a way that permits the hardboard panels 12 to generally contact each other despite the insertion of the connector strip 490 between the hardboard panels 12.

The connector strip 490 may be made of plastic, metal, or one or more other suitable materials, and may be a unitary device or be made of two or more interconnected pieces.

The length of the connector strip 490 may be less than, the same as, or greater than the corresponding length of a particular subfloor component 10. As will be understood, the connector strip 490 functions to align the hardboard layers 12 and to thereby keep the adjacent subfloor components 10 into which it is inserted from significantly shifting relative to each other thereby providing a more unitary subfloor, and generally on the same plane as each other.

In another alternative configuration, one or both of the opposing tongues 494 of the connector strip may alternatively have barbs extending therefrom for frictionally engaging, or "gripping", the insides of the groove(s) 482 to help with resisting of sliding of the connector strip relative to the subfloor components. As will be understood, such a barbed configuration would make it easy for an installer to insert a connector strip into grooves.

In another alternative configuration, a connector may be provided that has no central body but that simply consists of tongues 494.

Although in the embodiment shown in FIG. 25, there are grooves formed along two (2) opposing sides of the hardboard panel, in other embodiments, there may alternatively be grooves formed along the four (4) sides of the hardboard panel.

The many features and advantages of the invention are apparent from the detailed specification and, thus, it is intended by the appended claims to cover all such features and advantages of the invention that fall within the true purpose of the invention. Further, since numerous modifications and changes will readily occur to those skilled in the art, it is not desired to limit the invention to the exact operation illustrated and described, and accordingly all suitable modifications and equivalents may be resorted to, falling within the purpose and scope of the invention.

For example, the moisture-resistant film may be made of other materials, such as polyethylene, polyester, polypropylene, polyvinyl chloride (PVC), polyethylene terephthalate (PET), or acrylonitrile butadiene styrene (ABS). Furthermore, materials for the hardboard panel may be selected from plywood, fiber cement board, cement board, and magnesium oxide board. Other materials, provided that they provide a suitable amount of rigidity, may be employed for the hardboard panel.

Furthermore, while in the embodiments disclosed above the pedestals are generally uniformly distributed across the hardboard panel, alternatives may be provided having pedestals that are not so uniformly distributed.

Although in the embodiment described above, each wall of each pedestal is undercut, in other embodiments, each pedestal may alternatively comprise one or more walls that are not undercut. In still other embodiments, one or more pedestals may have no walls that are undercut.

Although in the embodiment described above, the angle $\theta$ associated with the undercut wall is about 25 degrees, in other embodiments, the angle $\theta$ may have value in the range from about 2.5 degrees to about 50 degrees.

Although in the embodiment described above, each undercut wall has an imaginary line extending the length of the wall surface that defines the angle $\theta$ with an imaginary line extending perpendicularly between the first face and the second face, in other embodiments, the each undercut wall may alternatively have an imaginary line extending only a portion of the length of the wall surface that defines the angle $\theta$ with the imaginary line extending perpendicularly between the first face and the second face. In one such embodiment, the portion of the length of the wall surface may define an undercut facet of the wall surface.

Although embodiments have been described above with reference to the accompanying drawings, those of skill in the art will appreciate that variations and modifications may be made without departing from the scope thereof as defined by the appended claims.

What is claimed is:
1. A subfloor component comprising:
   a hardboard panel having first and second opposing faces and a plurality of intersecting grooves to define, in cross-section, a plurality of pedestals having walls that extend into the panel from the first face toward the second face, at least one of the pedestals having at least one wall that is undercut; and a film of substantially moisture-impervious material attached to the first face of the panel and that conforms to the tops and walls of the pedestals and to the bottoms of the grooves.

2. The subfloor component of claim 1, wherein the at least one wall that is undercut defines an overhang over one or more of the grooves.

3. The subfloor component of claim 1, wherein an angle is defined between:
- a line that extends perpendicular to the first face, and
- the undercut wall.

4. The subfloor component of claim 3, wherein the angle is from about 2.5 degrees to about 50 degrees.

5. The subfloor component of claim 1, wherein the film is mechanically attached to the panel.

6. The subfloor component of claim 1, wherein the film is attached to the panel by melting or partially melting the film onto the panel.

7. The subfloor component of claim 1, wherein the film is spray coated onto the panel.

8. The subfloor component of claim 1, wherein the film is pre-formed to define a plurality of recesses shaped to receive the pedestals of the hardboard panel.

9. The subfloor component of claim 8, wherein the film is attached to the panel by snapping the recesses onto the pedestals.

10. The subfloor component of claim 9, wherein each recess is shaped to clip onto a respective pedestal.

11. The subfloor component of claim 1, wherein the film comprises material selected from the group comprising plastic or polymer.

12. The subfloor component of claim 11, wherein the plastic or polymer is selected from the group consisting of: polystyrene, polyethylene, polyester, polypropylene, polyvinyl chloride (PVC), polyethylene terephthalate (PET), or acrylonitrile butadiene styrene (ABS).

13. The subfloor component of claim 1, wherein the pedestals are generally uniformly distributed across the first surface of the panel.

14. The subfloor component of claim 1, wherein the hardboard panel comprises material selected from the group consisting of: OSB (oriented strand board), plywood, fiber cement board, cement board, and magnesium oxide board.

15. The subfloor component of claim 1, wherein the subfloor component is shaped to connect to another subfloor component.

16. A method of manufacturing a subfloor component, comprising:
- shaping a hardboard sheet to form a hardboard panel having, in cross-section, a plurality of pedestals with walls that extend into the panel from a first face of the panel toward a second opposing face of the panel, at least one of the pedestals having at least one wall that is undercut; and
- attaching a substantially moisture-impervious film to the first face of the panel, the film conforming to the tops and walls of the pedestals and to the bottoms of the grooves.

17. The method of claim 16, wherein attaching the film comprises:
- partially melting or melting the film onto the first face of the panel.

18. The method of claim 17, wherein attaching the film comprises:
- spray coating the film onto the first face of the panel.

19. The method of claim 17, further comprising:
- providing a pre-formed film having a plurality of recesses that are shaped to receive the pedestals of the hardboard panel.

20. The method of claim 19, wherein attaching the film comprises:
- snapping the recesses onto the pedestals.

21. The method of claim 20, wherein each recess is shaped to clip onto a respective pedestal.

* * * * *